United States Patent Office 3,525,208
Patented Aug. 25, 1970

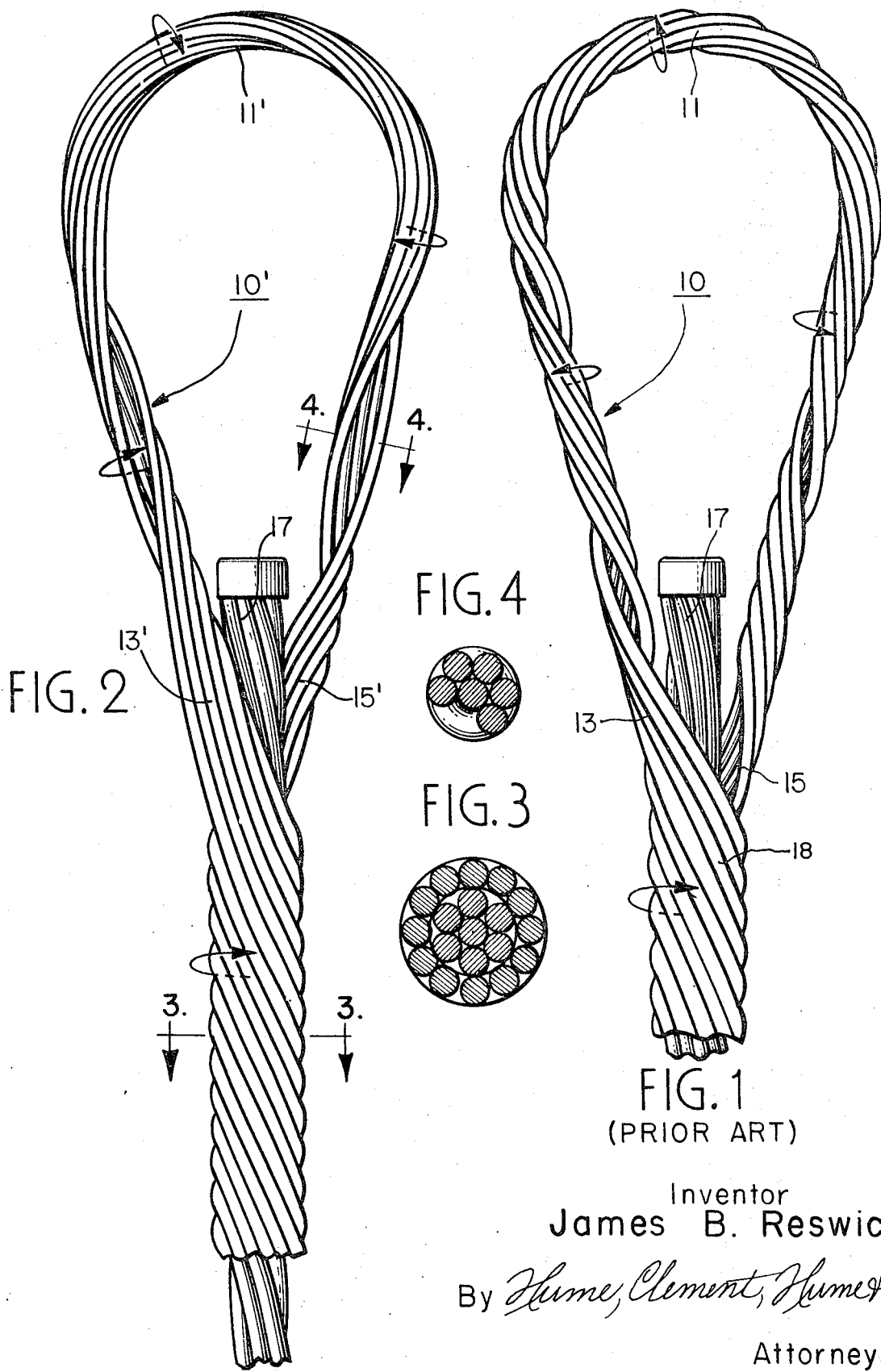

3,525,208
APPLIANCE FOR LINEAR BODY
James B. Reswick, Bratenahl, Ohio, assignor to Preformed Line Products, Cleveland, Ohio, a corporation of Ohio
Filed June 3, 1969, Ser. No. 830,079
Int. Cl. D07b 1/06
U.S. Cl. 57—145                                         4 Claims

ABSTRACT OF THE DISCLOSURE

A helically preformed appliance for dead-ending cables, etc., and its method of manufacture are disclosed. The appliance comprises a pair of elongated end portions each composed of a plurality of helically preformed strands with a mutually conforming hand of lay and an internal helical diameter of a size tightly to grip a cable or the like when wrapped around the latter in encircling engagement. An intermediate bight portion of the appliance, integral with the end portions, has its strands twisted in a hand of lay that is the reverse of that of the end portions. Other features are disclosed.

SPECIFICATION

Introduction

The present invention relates generally to appliances for linear bodies and, more particularly, is directed to a new and improved appliance suited particularly for use as a dead-end for cables or the like.

Background of the invention

In Peterson Pat. 2,761,273 and certain of the patents therein cited, there are disclosed and claimed helically preformed appliances for gripping and lashing cables or the like. More particularly, one embodiment disclosed in the above Peterson patent comprises a plurality of helically preformed elements grouped and intertwisted to form a half-set of elements mutually conforming as to hand of lay, internal helical diameter and pitch length. This half-set is return bent at its middle to define a bight having a pair of elongated legs extending in adjacent relation therefrom, the legs being adapted for intertwisting about a core element or cable thereby to grip and hold the core element. As shown in FIG. 6 of the above-cited patent, the helices in the bight region are further twisted into a closed lay to provide a cable-like bight configuration.

It has been found that whenever helical appliances, as above-described, are subjected to tension loading in a direction axially of the core element which they grip, there is a tendency for the dead-end to untwist or "peel" from the core element, particularly in the region of the "cross-over point," i.e., the region at the juncture between the helical legs and the bight of the legs where wrapping about the core element is initiated. Such a tendency, though inconsequential under average conditions, can prove highly undesirable under extreme loading conditions because the dead-end might untwist and loosen sufficiently to release the cable.

Summary of the invention

It is an objective of the present invention to provide a helically preformed dead-end which substantially precludes the tendency of the helical legs to unwrap from or loosen from the cable under conditions of extreme cable loading.

The present invention provides an improvement over the dead-end appliances disclosed in the earlier cited Peterson patent, and also teaches methods of manufacturing the improved construction.

Specifically, the invention is directed to a helically preformed device comprising a pair of elongated leg portions helically preformed with a predetermined hand of lay. The device further includes an intermediate bight portion integral with the pair of leg portions that has a hand of lay opposite to the hand of lay of the leg portions.

According to the method of the invention, there are formed a plurality of elongated helical elements, each having an internal helical diameter of a size tightly to grip a core element or cable when wrapped therearound, and having the same hand of lay and pitch length so as mutually to conform when intertwisted with one another about a common helical axis. An assembly of such helical elements, constituting a half-set, is first produced so that the ultimate leg portions and intermediate bight portion are in a straight line. Such half-set assembly is then held by revoluble clamps disposed between each leg portion and the adjacent bight portion. The clamps are relatively rotated, first, to untwist the elements in the bight portion to the point where they are momentarily straight and parallel to the helical axis, and then to continue to twist them in the same direction until they are intertwisted into conforming helices having a hand of lay that is opposite or reverse to the hand of lay of the original helices of the elements remaining in the leg portions. Such bight portion may be loosely or tightly cabled with the reverse hand of lay, after which it is return bent to define the bight from which the helical legs depend for intertwisting about a core or a cable to grip the same.

If preferred, the helical elements may each be originally constituted with a straight bight portion so that when assembled into mutual conformance, the straight bight portion can be twisted to impart directly the reverse helical lay previously described, without first untwisting, prior to bending to constitute the bight.

Brief description of the drawings

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 is an elevational view of a prior art dead-end construction;

FIG. 2 is an elevational view of a dead-end constructed in accordance with the teachings of the present invention;

FIG. 3 is a cross-sectional view taken along lines 3—3 of FIG. 2; and

FIG. 4 is a cross-sectional view taken along lines 4—4 of FIG. 2.

Description of the preferred embodiments

Referring now to FIG. 1, there is shown, as denoted generally by the reference numeral 10, a prior art dead-end construction similar to one of the embodiments disclosed in the aforementioned Peterson Pat. 2,761,273. Basically, the appliance 10 comprises a grouping of elements on strands helically preformed over their full length and return bent at their midpoint thereby to define a bight 11 and a pair of leg portions 13 and 15. The leg portions 13 and 15 each comprise a half-set of helical elements preformed to an internal diameter and pitch length tightly to grip and enclose a cable 17 when intertwisted thereabout. The helical elements in the region of the bight 11 are, in a preferred embodiment, further twisted in the angular direction of their original hand of lay to form the bight into a closed lay as shown in the drawing. Further details on the construction, various modifications thereof and their methods of manufacture may be had by reference to the earlier cited Peterson patent.

It has been found, as earlier discussed herein, that there is a discernable tendency for the helical leg portions 13 and 15 to untwist or peel off of the cable 17 when the cable is subjected to high axial loading. This tendency is initiated at the crossover point 18 of the two leg portions 13 and 15. This unwrapping or untwisting of the leg portions 13 and 15 from the cable 17 is associated with the observed rotation of the leg portions 13 and 15 relative to the bight 11 that occurs when the cable 17 is placed under an axial load. Although it is unusual for this untwisting action to progress to a point where the cable 17 will be completely released, loosening of the grip to the point of slippage becomes a disturbing possibility, leading to substantial human hazards and other dangerous conditions attendant upon downed electrical conductors.

The above-described problem is substantially avoided or counteracted by the dead-end construction of the invention illustrated in FIG. 2 of the drawings. The construction of FIG. 2 may be substantially identical to that of the prior art construction of FIG. 1 excepting for one feature presently to be considered. To illustrate the correspondence between the two constructions, the same reference numerals are applied in FIG. 2 with the addition of primes.

More particularly, in accordance with the teachings of the present invention, the dead-end of FIG. 2 differs from that of FIG. 1 in that the bight portion 11' is twisted into a closed lay in an angular direction opposite to that of its legs 13' and 15'. This reverse lay is evident on comparison of the two drawings wherein it is indicated by the respective arrows in each figure denoting the hand of lay of the bight and leg portions of the assemblies 10 and 10'. It has been found that by providing a hand of lay in the bight portion 11' opposite of that of the two leg portions 13' and 15', the tendency of the legs 13' and 15' to untwist is offset and cancelled by the similar but opposite tendency of the twisted bight portion 11'. Thus, the adherence of the helical leg portions 13' and 15' to the central cable 17' is not materially affected by axial loading of the cable.

It is presently preferred that the dead-end construction of the invention be manufactured by a technique which involves first forming a plurality of elongated helical elements each with an internal diameter of a size to tightly grip a predetermined core element when wrapped around the latter in encircling engagement. These individual elements are then grouped to define an elongate assembly of helical elements mutually conforming as to hand of lay. The procedures for making such helical assemblies are now well known to the art and need not be considered in further detail herein.

The intermediate portion only of the elongate helical assembly is twisted in an angular direction opposite to the hand of lay of both helical end portions so that the intermediate portion is formed with a hand of lay opposite to that of the two end portions of the assembly. The assembly is now return bent at its middle such that the intermediate assembly portion forms the bight 11' of the dead-end. The appliance is now in condition for installation on a cable or the like. It will be understood that the installation procedures for the dead-end of the present invention may conform to the well-known practices for installing the prior art dead-end appliance of FIG. 1.

While a particular embodiment of the preent invention has been shown and described, it is apparent that various changes and modifications may be made, and it is therefore intended in the following claims to cover all such modifications and changes as may fall within the true spirit and scope of this invention.

I claim:
1. A helically preformed device comprising:
   a pair of elongated end portions helically preformed with a predetermined hand of lay;
   and an intermediate bight portion integral with said pair of end portions and having a hand of lay opposite to that of said predetermined hand of lay.
2. The helically preformed device of claim 1 in which said pair of end portions each include a plurality of helical strands mutually conforming as to hand of lay, internal diameter and pitch length, the latter two dimensions being such as to admit of wrapping the helicles around a linear body from its side in gripping relation therewith.
3. The helically preformed device of claim 2 in which said bight portion includes a plurality of strands each integral with corresponding strands of said pair of end portions and in which said strands of said bight portion are twist to form a closed lay.
4. A method of making a dead-end device comprising the steps of:
   forming a plurality of elongated helical elements each having an internal helical diameter of a size to tightly grip a core element when wrapped around the latter in encircling engagement;
   grouping said plurality of elements to define an assembly of helical elements mutually conforming as to hand of lay, said assembly having a pair of end portions and an intermediate portion;
   twisting said intermediate portion of said assembly to cable said elements of said intermediate portion with a hand of lay that is the reverse of that of said assembly end portions; and
   bending said intermediate portion of said assembly to define therefrom a return bent bight portion.

References Cited
UNITED STATES PATENTS

| | | | |
|---|---|---|---|
| 2,947,504 | 8/1960 | Ruhlman | 57—145 XR |
| 3,042,745 | 7/1962 | Williams. | |
| 3,080,631 | 3/1963 | Ruhlman | 57—145 XR |
| 3,295,311 | 1/1967 | Butz et al. | 57—145 |
| 3,299,626 | 1/1967 | Payer et al. | 57—145 |
| 3,406,513 | 10/1968 | Butz et al. | 57—145 |
| 3,455,099 | 7/1969 | Butz | 57—149 |

DONALD E. WATKINS, Primary Examiner

U.S. Cl. X.R.

57—161